United States Patent [19]
Dickinson et al.

[11] 3,835,145
[45] Sept. 10, 1974

[54] 2- AND 3-PYRIDYLISOTHIOCYANATES
[75] Inventors: William B. Dickinson, Albany;
Marcia P. Vaupotic, Troy, both of N.Y.
[73] Assignee: Sterling Drug Inc., New York, N.Y.
[22] Filed: Sept. 11, 1972
[21] Appl. No.: 287,620

[52] U.S. Cl. ............... 260/294.8 E, 260/293.69, 260/294.8 G, 424/263, 424/267
[51] Int. Cl. ........................................... C07d 31/50
[58] Field of Search ............... 260/294.8 G, 294.8 E

[56] References Cited
UNITED STATES PATENTS
2,789,114   4/1967   Fischback et al. ........... 260/294.8 E OTHER PUBLICATIONS
Knott, Chem. Abstracts, Vol. 53, No. 2, pp. 944d–946e, Jan. 25, 1969.
Chem. Abstracts, Vol. 68, Page 6662, item 68993k, Apr. 1, 1968.

Primary Examiner—Alan L. Rotman
Attorney, Agent, or Firm—Elmer J. Lawson; William G. Webb

[57] ABSTRACT

N-(2-and 3-Pyridyl)-1-polymethyleneiminothiocarboxamides useful as anthelmintic agents and prepared by reaction of certain 2- or 3-pyridylisothiocyanates, which are also useful as anthelmintic agents, with an appropriate polymethyleneimine.

6 Claims, No Drawings

2- AND 3-PYRIDYLISOTHIOCYANATES

ORGANIC COMPOUNDS AND THEIR PREPARATION

This invention relates to N-(2- and 3-pyridyl)-1-polymethyleneiminothiocarboxamides, which are useful as anthelmintic agents and which have the formulas Ia and Ib:

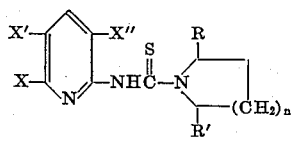

Ia

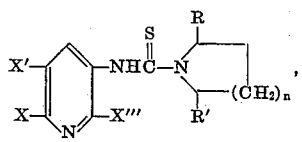

Ib wherein X is hydrogen, bromine, lower-alkyl or lower-alkoxy; X' is hydrogen, bromine, chlorine or lower-alkyl; X'' is hydrogen or bromine; X''' is hydrogen or lower-alkoxy; R is hydrogen, lower-alkyl or hydroxymethyl; R' is hydrogen or lower-alkyl; and n is one of the integers 1 and 2.

Particularly preferred compounds within the ambit of the invention are those of formula Ia wherein X is hydrogen or lower-alkyl; X' is hydrogen, bromine, chlorine or lower-alkyl; X'' is hydrogen; and R, R' and n have the meanings given above, which are represented by formula Ic:

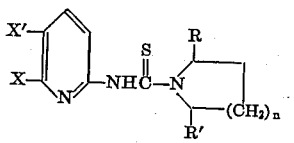

Ic and also those of formula Ib wherein X is lower-alkoxy; X' and x''' are both hydrogen; R and R' are both lower-alkyl; and n is 2, which are represented by formula Id:

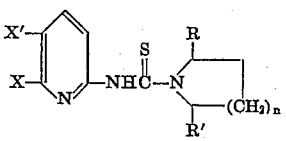

Id

For the sake of brevity, the compounds of formulas Ia, Ib, Ic and Id will be hereinafter referred to as the compounds of formula I having the composite general formula:

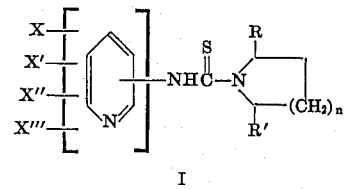

I

As used herein, the terms "lower-alkyl" and "lower-alkoxy" mean saturated, monovalent aliphatic radicals, including straight or branched-chain radicals, of from one to four carbon atoms, as illustrated by, but not limited to, methyl, ethyl, propyl, isopropyl, butyl, sec.-butyl, isobutyl, methoxy, ethoxy, propoxy, isopropoxy, butoxy, and the like.

The compounds of formula I are prepared by reaction of a 2- or 3-pyridylisothiocyanate of formula II with an appropriate polymethyleneimine of formula III. The reaction is represented as follows:

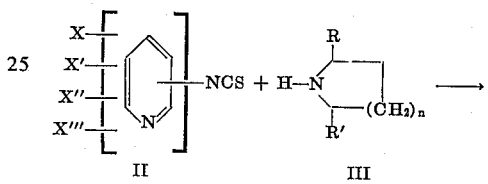

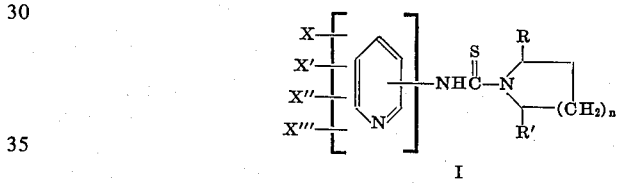

wherein X, X', X'', X''', R, R' and n have the meanings given above, and where formula II is to be understood as representing a composite general formula of compounds of formulas IIa, IIb, IIc and IId as follows:

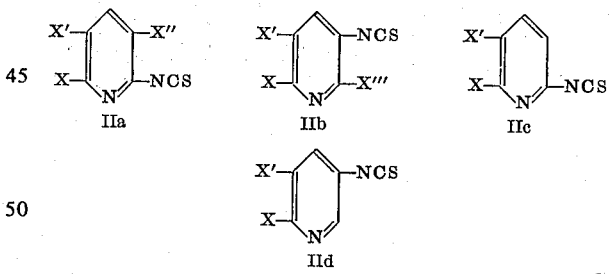

The reaction is carried out in an aprotic, organic solvent inert under the conditions of the reaction, for example diethyl ether, hexane, benzene, toluene, xylene, and the like. Preferred solvents are diethyl ether, hexane and toluene. The reaction generally takes place at room temperature, but if desired, reaction can be expedited by heating the mixture to the boiling point of the solvent used.

The isothiocyanates of formula II are, in turn, prepared by reacting, at a temperature in the range from 0°–40°C, an appropriate 2- or 3-pyridylamine of formula IV with thiophosgene, preferably in the presence of an acid-acceptor. The reaction is represented by the equation:

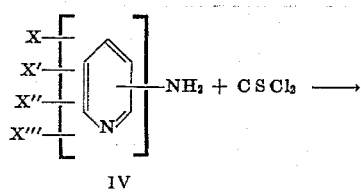

IV

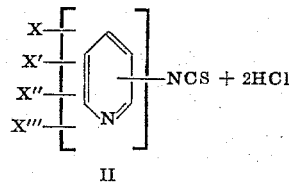

II wherein X, X', X'' and X''' have the meanings given above, and where formula IV is to be understood as representing a composite general formula of compounds of formulas IVa, IVb, IVc and IVd as follows:

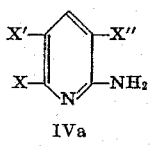 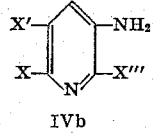 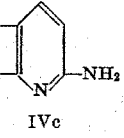

IVa     IVb     IVc

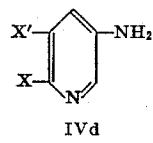

IVd

The reaction is carried out in an organic solvent inert under the conditions of the reaction, for example chloroform, methylene dichloride, ethylene dichloride, benzene, toluene, xylene, ethyl acetate, hexane, and the like. A preferred solvent is methylene dichloride, and a preferred acid-acceptor is an alkali metal bicarbonate, for example sodium bicarbonate, or an alkaline earth carbonate, for example calcium carbonate.

Alternatively, the 2- and 3 -pyridylisothiocyanates of formula II can be prepared by the method of Jochims, Ber. 101, 1751 (1968) in which a 2- or 3-pyridylamine is reacted with carbon disulfide and dicyclohexylcarbodiimide in the presence of a strong base, for example a tri-lower-alkylamine such as triethylamine, and at a temperature below 0°C. to give the corresponding 2- or 3-pyridylisothiocyanate and N,N'- dicyclohexylthiourea. The method is represented by the following reaction sequence:

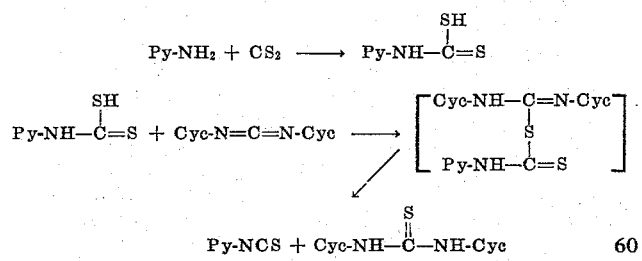

wherein Py represents a 2- or 3-pyridyl (or substituted 2- or 3- pyridyl) group, and Cyc represents the cyclohexyl group.

The 2- and 3-pyridylisothiocyanates of formula II are also useful as anthelmintic agents, and particularly preferred compounds for this purpose within the ambit of formula II are those of formula IIc wherein X is hydrogen, and X' is chlorine, bromine or lower-alkyl and also those of formula IId where X is lower-alkoxy and X' is hydrogen.

The polymethyleneimines of formula III and the 2- and 3-pyridylamines of formula IV are both well-known classes of compounds and are generally commercially available.

In standard biological test procedures, the compounds of formulas I and II have been found to possess anthelmintic activity and are useful as anthelmintic agents. Anthelmintic activity was determined in mice against one species of roundworm (*Nematospiroides dubius*), one species of pinworm (*Syphacia obvelata*) and one species of tapeworm (*Hymenolepis nana*) and in dogs against the hookworm, *Acylostoma caninum*. The various test procedures used are described as follows: Swiss mice weighing approximately 20 grams were infected with approximately 20 larvae of *N. dubius* which were administered in 10 percent gelatin via stomach tube. For screening purposes, compounds, made up in 10 percent gelatin, were administered via stomach tube in equally divided daily doses for four consecutive days beginning 14 days after infection. 4 days after the final medication, the animals were sacrificed and examined for the presence of worms. Efficacy against *N. dubius* was judged on the basis of percent worm reduction compared to control non-medicated mice. In addition, for the purpose of evaluation, the compounds were administered orally to a series of animals at graded doses, each animal receiving a single dose, and the results against *N. dubius* expressed in terms of an Effective Dose$_{50}$ (Ed$_{50}$), the Ed$_{50}$ representing the dose necessary to remove 50 percent of the worm burden.

The same test procedures described above were used to assess the effectiveness of the compounds against *S. obvelata*, a naturally occurring pinworm infection in Swiss mice. Efficacy was judged by the percent of mice cleared of the infection compared to non-medicated control mice.

In tests against the tapeworm, *H. nana*, Swiss mice weighing approximately 20 grams were infected with approximately 12,000 ova of *H. nana* administered in 10 percent gelatin via stomach tube. The test compounds, made up in 10 percent gelatin, were administered via stomach tube in equally divided doses daily for 4 consecutive days beginning 12 days after infection. 4 days after the final medication, the animals were sacrificed and examined for the presence of worms. Efficacy was judged by the percent of mice cleared compared to non-medicated control mice.

In tests against *A. caninum* of naturally infected mongrel dogs, food was withheld from the dogs for a minimum of 5 hours prior to, and for 3 to 5 hours after, each administration of the test agent. Single doses of the test agent were administered orally in a gelatin capsule, as a suspension in gum tragacanth and in a solution of 2.5 to 5.0 percent peanut oil to groups of four to eleven dogs. The dogs were sacrificed four days after the medication, and the intestines examined for worm. Anthelmintic efficacy was expressed in terms of the percent reduction in Stoll fecal egg counts and in the number of hookworms counted at autopsy as well as by critical tests wherein each animal acts as its own control and a comparison is made of the number of worms removed from the feces after medication with the number of worms harbored by the animal at autopsy.

The 2- and 3-pyridylisothiocyanates of formula II and the N-(2- and 3-pyridyl)-1-polymethyleneiminothiocarboxamides of formula I were found to reduce or eliminate the helminth burden from infected mice or dogs when administered in the dose range of from 1 to 200 mg./kg. The compounds are preferably administered orally, and the amount of a particular compound to be administered, either by itself or as the essential active ingredient in a formulation, will range from 1 to about 200 mg./kg. The number of doses administered range from one to two per day for from one to five consecutive days, depending on the severity of the helminth infestation.

The actual determination of the numerical biological data definitive for a particular compound of formula I or II is readily determined by standard test procedures by technicians versed in pharmacological test procedures, without the need for any extensive experimentation.

The compounds of formulas I and II can be prepared for use by incorporation in unit dosage form as tablets or capsules for oral administration either alone or in combination with suitable adjuvants such as calcium carbonate, starch, lactose, sodium bicarbonate, sodium lauryl sulfate, sugar, dextrose, mannitol, cellulose, gum acacia, and the like. Alternatively, they can be formulated for oral administration in aqueous alcohol, glycol, or oil solutions or oil-water emulsions in the same manner as conventional medicinal substances are prepared. They can also be formulated for oral use with foodstuffs or admixed with foodstuffs for veterinary use.

The molecular structures of the compounds of the invention were assigned on the basis of study of their infrared, ultraviolet, and NMR spectra, and confirmed by the correspondence between calculated and found values for elementary analyses for the elements.

The following examples will further illustrate the invention without, however, limiting it thereto. All melting points are uncorrected.

Example 1

Into a three-necked flask equipped with a mechanical stirrer and two dropping funnels and containing 34 g. (0.23 mole) of thiophosgene was added simultaneously and with vigorous stirring a solution of 50 g. (0.4 mole) of sodium bicarbonate in 500 ml. of water and a solution of 25.6 g. (0.2 mole) of 2-amino-5-chloropyridine in 600 ml. of methylene dichloride. When addition of both solutions was completed, the organic layer was separated, dried over anhydrous calcium sulfate and taken to dryness in vacuo. The dark residue was dissolved in about 2 liters of n-hexane, filtered, and concentrated to a volume of about 60 ml. The solid which crystallized out was collected and recrystallized once again from n-hexane to give 8.2 g. of 5-chloro-2-pyridylisothiocyanate, m.p. 41°–43°C.

The above 5-chloro-2-pyridylisothiocyanate (0.049 mole) was dissolved in 75 ml. of absolute ether, filtered, and treated with 5 ml. of 2,6-dimethylpiperidine. The mixture was chilled, and the solid which crystallized was collected and recrystallized from n-hexane to give 5.5 g. of N-(5-chloro-2-pyridyl)-2,6- dimethyl-1-piperidinethiocarboxamide, m.p. 109°–110°C.

Example 2

Reaction of 5-chloro-2-pyridylisothiocyanate with 2,6-diethylpiperidine [Netherlands Application No. 6,605,452, published Oct. 24, 1966; C. A. 66, P 104914e (1967)] using the manipulative procedure described above in Example 1 affords N-(5- chloro-2-pyridyl)-2,6-diethyl-1-piperidinethiocarboxamide.

Example 3

Ten grams (0.06 mole) of 5-chloro-2-pyridylisothiocyanate dissolved in 50 ml. of n-hexane was reacted with 20 ml. of 2-methylpiperidine dissolved in 50 ml. of n-hexane using the procedure described above in Example 1. The product which separated from the cooled reaction mixture was collected and recrystallized from acetonitrile to give 20 g. of N-(5-chloro-2-pyridyl)2-methyl -1-piperidinethiocarboxamide, m.p. 117°–119°C.

Example 4

Reaction of 5-chloro-2-pyridylisothiocyanate with 2-ethylpiperidine; 2-isopropylpiperidine; 2-sec.-butylpiperidine [all described by Bruylants, Bull. soc. chim. Belg. 33, 467–78 (1924)]; 2-butylpiperidine or 2-isobutylpiperidine [both described by Menshikov et al., Ber. 69B, 1790-802 (1936)] using the manipulative procedure described above in Example 1 affords, respectively, N-(5-chloro-2-pyridyl)-2-ethyl-1-piperidinethiocarboxamide; N-(5-chloro-2-pyridyl)-2-isopropyl-1-piperidinethiocarboxamide; N-(5-chloro-2-pyridyl)-2-sec.-butyl-1-piperidinethiocarboxamide; N-(5-chloro-2-pyridyl)-2-butyl-1-piperidinethiocarboxamide; and N-(5-chloro-2-pyridyl)-2-isobutyl-1-piperidinethiocarboxamide.

Example 5

Ten grams (0.06 mole) of 5-chloro-2-pyridylisothiocyanate in 250 ml. of toluene was treated with 7 ml. of piperidine using the procedure described above in Example 1. The crude product was recrystallized from n-hexane to give 3.0 g. of N-(5-chloro-2-pyridyl)-1-piperidinethiocarboxamide, m.p. 100°–102°C.

Example 6

A solution of 8.5 g. (0.05 mole) of 5-chloro-2-pyridylisothiocyanate in 75 ml. of diethyl ether was treated with a solution of 5.8 g. (0.05 mole) of 2-hydroxymethylpiperidine in 100 ml. of diethyl ether using th procedure described above in Example 1. The crude product obtained from the reaction mixture was recrystallized from acetonitrile to give 5.0 g. of N-(5-chloro-2-pyridyl)-2-(hydroxymethyl)-1-piperidinethiocarboxamide, m.p. 145°–147.5°C.

Example 7

A solution of 10 g. (0.06 mole) of 5-chloro-2-pyridylisothiocyanate in 230 ml. of toluene was treated with 8 ml. of 2,5-dimethylpyrrolidine using the procedure described above in Example 1. The material obtained from the reaction mixture was recrystallized from diethyl ether to give 4.0 g. of N-(5-chloro-2-pyridyl)-2,5-dimethyl-1-pyrrolidinethiocarboxamide, m.p. 114°–117°C.

Example 8

Reaction of 5-chloro-2-pyridylisothiocyanate with 2-methyl-5-ethylpyrrolidine; 2-methyl-5-propylpyrrolidine; 2,5-diethylpyrrolidine; 2-ethyl-5-propylpyrrolidine; 2,5-dipropylpyrrolidine [all disclosed by Shuiken et al., Izv. Akad. Nauk S.S.S.R., Ser. Khim., 1964 (6), 1120-3; C.A. 61,6980b (1964)]; 2-ethyl-5-isopropylpyrrolidine; 2,5-diisopropylpyrrolidine [both disclosed by Rothenmund et al., J. Am. Chem. Soc. 77, 3340 (1955)[; 2-methyl-5-isopropyl-pyrrolidine [Wagner-Juaregg et al., Helv. Chim. Acta. 45,771-4 (1962)]; 2-propyl-5-butylpyrrolidine [Shuiken et al., Izv. Akad. Nauk S.S.S.R., Ser. Khim. 1963 (9) 1678-80; C.A. 59, 15246a (1963)]; 2-ethylpyrrolidine [DeJong et al., Rec. trav. chim. 49, 237-46 (1930)]; and 2-sec.-butylpyrrolidine [Menshikov., J. Gen. Chem. (U.S.S.R.) 7, 1632-4 (1937)] affords, respectively, N-(5-chloro-2-pyridyl)-2-methyl-5-ethyl-1-pyrrolidinethiocarboxamide; N-(5-chloro-2-pyridyl)-2-methyl-5-propyl-1-pyrrolidinethiocarboxamide; N-(5-chloro-2-pyridyl)-2,5-diethyl-1-pyrrolidinethiocarboxamide; N-(5-chloro-2-pyridyl)-2-ethyl-5-propyl-1-pyrrolidinethiocarboxamide; N-(5-chloro-2-pyridyl)-2,5-dipropyl-1-pyrrolidinethiocarboxamide; N-(5-chloro-2-pyridyl)-2-ethyl-5-isopropyl-1-pyrrolidinethiocarboxamide; N-(5-chloro-2-pyridyl)-2,5-diisopropyl-1-pyrrolidinethiocarboxamide; N-(5-chloro-2-pyridyl)-2-methyl-5-isopropyl-1-pyrrolidinethiocarboxamide; N-(5-chloro-2-pyridyl)-2propyl-5-butyl-1-pyrrolidinethiocarboxamide; N-(5-chloro-2-pyridyl)-2-ethyl-1-pyrrolidinethiocarboxamide; and N-(5-chloro-2-pyridyl)-2-sec.-butyl-1-pyrrolidinethiocarboxamide.

Example 9

Thiophosgene (8 g., 0.07 mole) in a three-necked round bottom flask was treated simultaneously with a solution of 11.3 g. (0.065 mole) of 2-amino-5-bromopyridine in 200 ml. of ethyl acetate and a solution of 10 percent aqueous sodium bicarbonate using the procedure described above in Example 1. There was thus obtained from the organic layer 9 g. of 5-bromo-2-pyridylisothiocyanate, m.p. 74°-76°C.

A solution of 3 g. (0.014 mole) of 5-bromo-2-pyridylisothiocyanate in 50 ml. of absolute ether was treated with a solution of 5 g. (0.04 mole) of 2,6-dimethylpiperidine using the procedure described above in Example 1. The solid which separated from the reaction mixture was collected and dried to give 4.5 g. of N-(5-bromo-2-pyridyl)-2,6-dimethyl-1-piperidinethiocarboxamide, m.p. 110°-112°C.

Example 10

A solution of 10 g. (0.05 mole) of 5-bromo-2-pyridylisothiocyanate in 200 ml. of absolute ether was treated with 10 ml. of 2-methylpiperidine using the procedure described above in Example 1. The solid which separated from the cooled reaction mixture was collected and recrystallized from methanol to give 8.4 g. of N-(5-bromo-2-pyridyl)-2-methyl-1-piperidinethiocarboxamide, m.p. 123°-125°C.

Example 11

A solution of 22.6 g. (0.2 mole) of thiophosgene in 30 ml. of methylene dichloride was treated simultaneously and with vigorous stirring with a solution of 24.8 g. (0.2 mole) of 3-amino-6-methoxypyridine and 320 ml. of a 10 percent aqueous sodium bicarbonate solution. The material obtained from the organic layer was recrystallized from n-hexane to give 22 g. of 6-methoxy-3-pyridylisothiocyanate, m.p. 54°-55°C.

A solution of 12 g. (0.08 mole) of 6-methoxy-3-pyridylisothiocyanate in 100 ml. of absolute ether was treated with 15 ml. of 2,6-dimethylpiperidine using the procedure described above in Example 1. The solid which separated from the reaction mixture was collected and dried to give 7.3 g. of N-(6-methoxy-3-pyridyl)-2,6-dimethyl-1-piperidinethiocarboxamide, m.p. 94°-95°C.

Example 12

Reaction of 3-amino-6ethoxypyridine [Chichibabin et al., J. Russ. Phys.-Chem. Soc. 50, 471-83 (1920); C.A. 18, 1494 (1924)]; 3-amino-6-propoxypyridine; 3-amino-6-butoxypyridine [both disclosed by Binz et al., Ber. 68B, 315-24 (1935)]; 2-amino-6-ethoxypyridine [den Hertog et al., Rec. trav. chim. 55, 122-30 (1936)]; and 2-amino-5-ethoxypyridine [Koenig et al., Ber. 61B, 1022-30 (1928)] with thiophosgene and aqueous sodium bicarbonate using the procedure described above in Example 1 affords, respectively, 6-ethoxy-3-pyridylisothiocyanate; 6-propoxy-3-pyridylisothiocyanate; 6-butoxy-3-pyridylisothiocyanate; 6-ethoxy-2pyridylisothiocyanate; and 5-ethoxy-2-pyridylisothiocyanate.

The latter, on reaction with 2,6-dimethylpiperidine using the procedure described above in Example 1 affords, respectively, N-(6-ethoxy-3-pyridyl)-2,6-dimethyl-1-piperidinethiocarboxamide; N-(6-propoxy-3-pyridyl)-2,6-dimethyl-1-piperidinethiocarboxamide; N-(6-butoxy-3-pyridyl)-2,6-dimethyl-1-piperidinethiocarboxamide; N-(6-ethoxy-2-pyridyl)-1-piperidinethiocarboxamide; and N-(5-ethoxy-2-pyridyl)-2,6-dimethyl-1-piperidinethiocarboxamide.

Example 13

To a solution of 11.3 g. (0.1 mole) of thiophosgene in methylene dichloride was added simultaneously, and with vigorous stirring, a solution of 10.8 g. (0.1 mole) of 2-amino-6-methylpyridine in 150 ml. of methylene dichloride and 170 ml. of a 10 percent aqueous solution of sodium bicarbonate using the procedure described above in Example 1.

The material isolated from the organic layer, consisting of 6-methyl-2-pyridylisothiocyanate, was reacted directly, without further purification, with 10 ml. of 2,6-dimethylpiperidine using the procedure described above in Example 1. The solid material which separated from the reaction mixture was recrystallized with charcoaling from n-hexane to give 3.7 g. of N-(6-methyl-2-pyridyl)-2,6-dimethylpiperidinethiocarboxamide, m.p. 103°-105°C.

Example 14

A solution of 48 g. (0.42 mole) of thiophosgene in 700 ml. of n-hexane was treated with a solution of 50 g. (0.46 mole) of 3-amino-5-methylpyridine dissolved in 720 ml. of 10 percent aqueous sodium bicarbonate. The material which was isolated from the organic layer was recrystallized from n-hexane to give 9.2 g. of 5-methyl-3-pyridylisothiocyanate, m.p. 47°-49°C.

The latter (3g., 0.02 mole) was reacted with 3 ml. of 2,6-dimethylpiperidine in 200 ml. of absolute ether using the procedure described above in Example 1. The material which separated from the reaction mixture was collected and dried to give 2 g. of N-(5-methyl-3- pyridyl)-2,6-dimethyl-1-piperidinethiocarboxamide, m.p. 72°–75°C.

Example 15

Reaction of 3-amino-6-ethylpyridine; 3-amino-6-propylpyridine; 3-amino-6-butylpyridine and 3-amino-6-sec.-butylpyridine [all disclosed by Graber, Can. J. Chem. 31, 1181-8 (1953)] with thiophosgene in the presence of aqueous sodium bicarbonate using the procedure described above in Example 1 affords, respectively, 6-ethyl-3-pyridylisothiocyanate; 6-propyl-3-pyridylisothiocyanate; 6-butyl-3-pyridylisothiocyanate and 6-sec.-butyl-3-pyridylisothiocyanate.

Reaction of the latter with 2,6-dimethylpiperidine using the procedure described above in Example 1 affords, respectively, N-(6-ethyl-3-pyridyl)-2,6-dimethyl-1-piperidinethiocarboxamide; N-(6-propyl-3-pyridyl)-2,6-dimethyl-1-piperidinethiocarboxamide; N-(6-butyl-3-pyridyl)-2,6-dimethyl-1-piperidinethiocarboxamide; and N-(6-sec.-butyl-3-pyridyl)-2,6-dimethyl-1-piperidinethiocarboxamide.

Example 16

A solution of 10.1g. (0.1 mole) of triethylamine, 20 ml. of pyridine and 40 ml. of carbon disulfide contained in a 3-necked flask equipped with a mechanical stirrer, a thermometer, and a dropping funnel was cooled in a dry ice bath to −10°C. and treated dropwise with stirring with a solution of 9.41 g. (0.1 mole) of 3-aminopyridine in 40 ml. of pyridine. When addition was complete, the reaction mixture was treated with a solution of 20.63 g. (0.1 mole) of dicyclohexylcarbodiimide in 20 ml. of pyridine, and the mixture stirred at −10°C. for three hours. The mixture was kept cool in a refrigerator for about 48 hours and the solid which separated was removed by filtration. The filtrate was taken to dryness leaving a residual oil which was dissolved in benzene and chilled. The solid which separated was removed by filtration, and the filtrate was once again taken to dryness leaving an oily residue which was distilled in vacuo to give 3-pyridylisothiocyanate, b.p. 84°–89°C./4.4 mm., $n_D^{27}$ 1.6598.

A solution of 3 g. (0.025 mole) of 3-pyridylisothiocyanate dissolved in 10 ml. of absolute ether was treated with a solution of 4 ml. of 2,6-dimethylpiperidine in 10 ml. of absolute ether using the procedure described above in Example 1. The solid which separated from the reaction mixture was collected and recrystallized from acetonitrile to give 7.0 g. of N-(3-pyridyl)-2,6-dimethyl-1-piperidinethiocarboxamide, m.p. 85°–87°C.

Example 17

A solution of 22.8 g. (0.2 mole) of thiophosgene in 50 ml. of methylene dichloride was treated dropwise with stirring with a solution of 50.4 g. (0.2 mole) of 2-amino-3,5-dibromopyridine in methylene dichloride. The reaction flask was stoppered and allowed to stand at room temperature for a few days and then shaken with about 100 ml. of a brine solution. The organic layer was separated, dried, taken to dryness in vacuo and the residual solid recrystallized once from n-pentane and once from n-hexane to give 4.7 g. of 3,5-dibromo-2-pyridylisothiocyanate, m.p. 61°–66°C.

A solution of 3 g. (0.01 mole) of 3,5-dibromo-2-pyridylisothiocyanate in 40 ml. of n-hexane was treated with a solution of 4 ml. of 2,6-dimethylpiperidine in 10 ml. of n-hexane using the procedure described above in Example 1. The solid which separated from the reaction mixture was collected and dried to give 4.0 g. of N-(3,5-dibromo-2-pyridyl)-2,6-dimethyl-1-piperidinethiocarboxamide, m.p. 121°–124°C.

Example 18

To a vigorously stirred mixture of 11.4 g. (0.1 mole) of thiophosgene, 100 ml. of water and about 20 ml. of methylene dichloride was added dropwise a solution containing 0.1 mole of 3-amino-2,6-dimethoxypyridine in about 400 ml. of methylene dichloride. The reaction was worked up using the procedure described above in Example 1, and there was thus obtained 7.8 g. of 2,6-dimethoxy-3-pyridylisothiocyanate, m.p. 55°–56°C.

A solution of 3.4 g. (0.017 mole) of 2,6-dimethoxy-3-pyridylisothiocyanate in 150 ml. of diethyl ether was treated with a solution of an equimolar amount of 2,6-dimethylpiperidine in diethyl ether. The solid which separated was collected and dried to give 5 g. of N-(2,6-dimethoxy-3-pyridyl)-2,6-dimethyl-1-piperidinethiocarboxamide, m.p. 77°–79°C.

Example 19

A solution of 8 g. (0.037 mole) of 5-bromo-2-pyridylisothiocyanate in 200 ml. of absolute ether was treated with a solution of 5 ml. of 2,5-dimethylpyrrolidine in 50 ml. of absolute ether. The product crystallized from the reaction mixture on cooling and was collected and dried to give 5.4 g. of N-(5-bromo-2-pyridyl)-2,5-dimethyl-1-pyrrolidinethiocarboxamide, m.p. 120°–122°C.

Example 20

A solution of 10 g. (0.047 mole) of 5-bromo-2-pyridylisothiocyanate in 100 ml. of n-hexane was treated with a solution of 6 ml. of piperidine in 50 ml. of hexane. The solid which separated was collected and dried to give 3.5 g. of N-(5-bromo-2-pyridyl)-1-piperidinethiocarboxamide, m.p. 110°–112°C.

Example 21

A solution of 10 g. (0.047 mole) of 5-bromo-2-pyridylisothiocyanate in 250 ml. of n-hexane was treated with 5 ml. of pyrrolidine. The solid which separated was collected, recrystallized from absolute ether and dried to give 4.4 g. of N-(5-bromo-2-pyridyl)-1-pyrrolidinethiocarboxamide, m.p. 122°–124°C.

We claim:
1. A compound having one of the following formulas

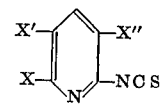

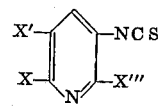

wherein X is hydrogen, bromine or lower-alkoxy; X' is hydrogen, bromine or chlorine; X" is hydrogen or bromine; and X''' is hydrogen or lower-alkoxy except X, X', X" and X''' are not simultaneously hydrogen.

2. A compound according to claim 1 having the formula

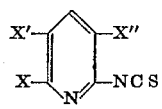

wherein X and X'' are hydrogen and X' is bromine or chlorine.

3. A compound according to claim 1 having the formula

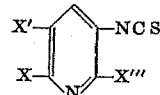

wherein X' and X''' are hydrogen and X is lower-alkoxy.

4. 5-Bromo-2-pyridylisothiocyanate according to claim 2.

5. 5-Chloro-2-pyridylisothiocyanate according to claim 2.

6. 6-Methoxy-3-pyridylisothiocyanate according to claim 3.

* * * * *